United States Patent
Aloszko et al.

(10) Patent No.: US 10,861,642 B2
(45) Date of Patent: Dec. 8, 2020

(54) POWER ELECTRONIC TAP CHANGER MODULE FOR TRANSFORMER

(71) Applicant: ABB Schweiz AG, Baden (CH)

(72) Inventors: Pawel Aloszko, Cracow (PL); Filip Grecki, Cracow (PL); Radoslaw Jez, Zory (PL); Krzysztof Obrebski, Warsaw (PL); Marcin Czopek, Cracow (PL); Magdalena Ostrogorska, Cracow (PL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/397,249

(22) Filed: Apr. 29, 2019

(65) Prior Publication Data

US 2019/0259530 A1    Aug. 22, 2019

Related U.S. Application Data

(63) Continuation of application No. PCT/EP2017/001172, filed on Oct. 4, 2017.

(30) Foreign Application Priority Data

Oct. 27, 2016    (EP) .................................. 16460078

(51) Int. Cl.
*G05F 1/20*       (2006.01)
*H01F 29/04*     (2006.01)
(Continued)

(52) U.S. Cl.
CPC ............... *H01F 29/04* (2013.01); *G05F 1/20* (2013.01); *G05F 1/67* (2013.01); *H01C 7/12* (2013.01); *H01H 9/0005* (2013.01); *H02H 7/055* (2013.01)

(58) Field of Classification Search
None
See application file for complete search history.

(56) References Cited

U.S. PATENT DOCUMENTS 3,786,337 A  *  1/1974  Kugler ................... H01F 29/04
                                                            323/343
5,602,462 A  *  2/1997  Stich ....................... G05F 1/147
                                                            307/64
(Continued)

FOREIGN PATENT DOCUMENTS

CN    2055423 U    4/1990
CN    1192281 A    9/1998
(Continued)

OTHER PUBLICATIONS

European Patent Office, International Search Report & Written Opinion issued in corresponding Application No. PCT/EP2017/001172, dated Jan. 22, 2018, 10 pp.
(Continued)

*Primary Examiner* — Jeffrey A Gblende
(74) *Attorney, Agent, or Firm* — Sage Patent Group

(57) ABSTRACT

The subject of the application is a power electronic tap changer module for transformer using power electronic elements connected to sections of a primary winding of the transformer. The power electronic tap changer module is equipped with valves having a pair of a thyristor or transistors connected with a controller and the valves are connected in series with the fuses, respectively. The module is equipped with an additional oversized tap line having an oversized valve rated for short circuit current, which valve is connected with an overvoltage triggering circuit. The oversized valve is equipped with a pair of thyristor or transistors connected with a thermally protected voltage suppressing device.

20 Claims, 2 Drawing Sheets

Figure 1:
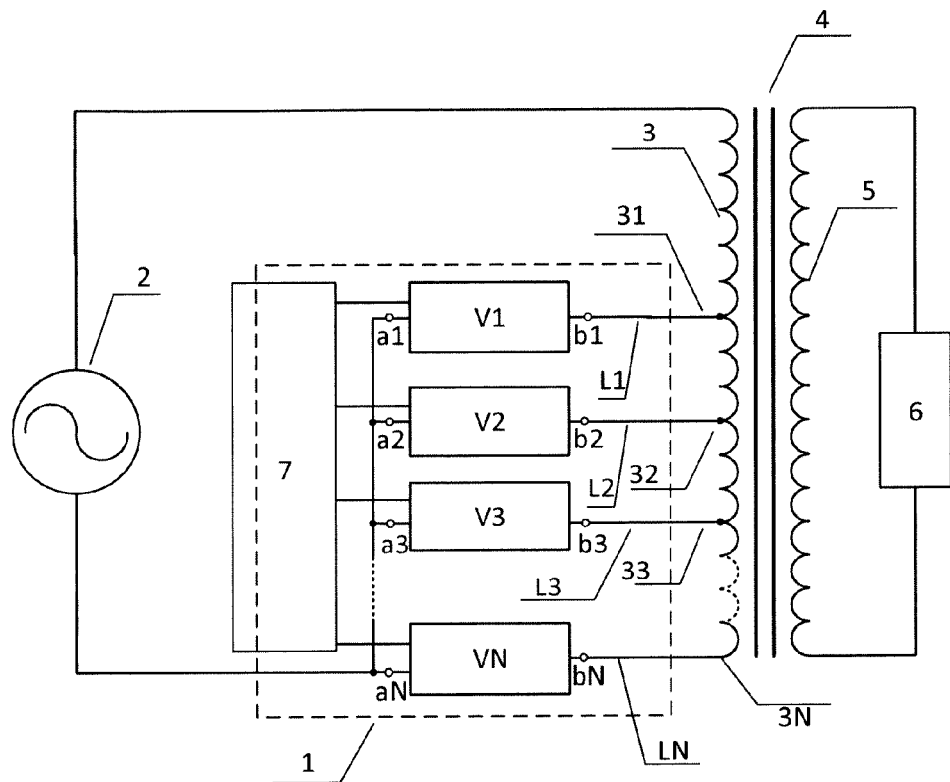

(51) Int. Cl.
  *H01C 7/12* (2006.01)
  *H01H 9/00* (2006.01)
  *H02H 7/055* (2006.01)
  *G05F 1/67* (2006.01)

(56) References Cited

U.S. PATENT DOCUMENTS

| | | | |
|---|---|---|---|
| 5,604,423 | A | 2/1997 | Degeneff et al. |
| 5,969,511 | A | 10/1999 | Asselman et al. |
| 6,226,162 | B1 | 5/2001 | Kladar et al. |
| 2009/0146637 | A1* | 6/2009 | Stich .................... H01H 9/0005 323/343 |
| 2011/0292693 | A1 | 12/2011 | Niijima et al. |
| 2015/0006024 | A1* | 1/2015 | Pauli .................... G01R 31/007 701/32.8 |
| 2015/0293544 | A1* | 10/2015 | Li .......................... G05F 1/147 323/341 |

FOREIGN PATENT DOCUMENTS

| | | |
|---|---|---|
| CN | 1225525 A | 8/1999 |
| CN | 1276641 A | 12/2000 |
| CN | 204030967 U | 12/2014 |
| CN | 205405317 U | 7/2016 |
| JP | S6074928 A | 4/1985 |
| JP | S61123912 A | 6/1986 |
| JP | 2002218652 A | 8/2002 |

OTHER PUBLICATIONS

European Patent Office, Extended Search Report issued in corresponding Application No. 16460078.5, dated Apr. 4, 2017, 6 pp.
Chinese Second Office Action dated Sep. 25, 2020 for Chinese Patent Application No. 201780080685.7, 8 pages (including English translation).
Li, Ming et al., "Overvoltage protection of high power IGBTs in wind power converters under short circuit," 2009 IEEE 6th International Power Electronics and Motion Control Conference, Wuhan, 2009, pp. 2288-2290.

\* cited by examiner

POWER ELECTRONIC TAP CHANGER MODULE FOR TRANSFORMER

The subject of the invention is a power electronic tap changer module for transformer using power electronic elements connected to sections of a primary winding of the transformer.

The power electronic switching elements connected to the transformer winding should conduct a nominal current, withstand a short circuit and overcurrent conditions and also withstand overvoltage or open circuit conditions with sustained power flow.

For the short circuit or overcurrent conditions the valves of the tap changer module very often are designed with oversized power electronic components, such as thyristors, IGBTs, MOSFETs, in order to withstand the short circuit or overcurrent for specified period of time. In some cases the short circuit or overcurrent duration may be of several seconds. For economic aspects it is not reasonable to apply oversized valves to all taps, especially as each tap changer module valve may consist of several elements in series, due to voltage requirements.

For protection of power electronic valves from overvoltages, standard transient voltage suppressors are used like: MOV (Metal Oxide Varistor) device or TVS diodes (Transient, Voltage Suppressor diodes), or spark-gaps, or gas discharge tubes. Such suppressors are able to prevent the rise of voltage across power electronic valve above rated level. The standard transient voltage suppressors are however designed to mitigate only short-time over-voltages due to their thermal limits. They are usually rated for 1.2/50 us pulse. In case of long-term over-voltages there is no possibility to protect the circuit with standard transient voltage suppressors. The standard mean of dealing with long-term overvoltage is activation of fuse, circuit breaker or current bypass.

In specific applications such as power electronic tap changer there is a need to avoid long term over-voltages or open circuit conditions, and at the same time maintain undisturbed power flow in the circuit, even if some components are malfunctioning. It is not allowed to leave the open circuit as it may lead to internal arc-fault in the transformer winding. The limitation of transient voltage suppressors is a significant decrease of their parameters and lifetime after each action/triggering in case of MOV device and spark gaps, or very limited power rating in case of TVS diodes.

From U.S. Pat. No. 5,604,423 there is known a tap changing system for operation with a transformer and featuring a special group of gate-controlled electronic devices that operate as a circuit breaker and recloser such that, after half-cycle of short-circuit current or overcurrent, said special group is transferred to the OFF-state, using external control signal, whereby the tap changer winding is open circuited. The advantages being that only the special group of devices need be rated to sustain short circuit conditions. The short circuit current or overcurrent conditions are handled by the invention described in U.S. Pat. No. 5,604,423 by specific valve triggering using external controller running specified algorithms, based on measurements. The presented technique utilizes power-electronic components in order to change the circuit topology in short time, at least single half-cycle, after the short circuit is detected. The presented solution does not maintain the undisturbed power flow in case of open circuit conditions, which is desired in tap changer applications. Therefore presented invention solves short circuit or overcurrent conditions issue only.

The essence of a power electronic tap changer module according to the invention, equipped with valves V1' ... VN' having a pair of a thyristors or transistors connected with a controller and with a transient voltage suppressor device for basic short-term overvoltage protection is that the valves V1' ... VN' are connected in series with the fuses F1 ... FN, respectively and the module is equipped with an additional oversized tap line having an oversized valve rated for short circuit current, which valve is equipped with an overvoltage triggering circuit. The oversized valve is equipped with a pair of thyristors or transistors connected in antiparallel to each other and the pair of thyristors or transistors is connected in parallel with a thermally protected voltage suppressing device.

Preferably the overvoltage triggering circuit has a MOV device or TVS diodes and a pair of diodes with reverse polarity.

Preferably the voltage suppressor device is a thermally protected MOV device or TVS diodes.

Preferably the oversized valve is connected directly to the primary winding of the transformer.

Preferably the valves V1'-VN' and the oversized valve are connected directly to voltage source.

Alternatively the valves V1'-VN' and the oversized valve are connected through part of winding to voltage source.

Preferably the oversized valve is rated for short-circuit current whereas the valves V1'-VN' are rated for nominal current.

Preferably the valves (V1'-VN') are equipped with thermally protected transient suppressing device.

The technique described in the present invention, is based only on hardware design of tap changer module featuring overvoltage triggering circuit and overcurrent protection means, and is independent of controller unit. Moreover the need for external measurements is eliminated. The short circuit current or overcurrent conditions, or open circuit conditions automatically result in triggering of nominal tap, rated for short circuit current. The present invention features also protection in case of open circuit or long-term overvoltage conditions. This is done automatically by immediate triggering of the tap changer nominal valve to reduce the voltage across tap changer module to the safe level. The solution maintains the undisturbed power flow through the module. The presented invention eliminates need for additional current measurement and triggering control means for power electronic tap changer module. The design of module and particular power electronic valves increase reliability of protection, as it does not rely on software application. Regarding the economy of the design only said tap changer nominal valve needs to be rated for short circuit current. Also no additional power electronic components need to be added to the circuit. The very same design enables also open circuit or long-term overvoltage protection which is strongly desired to maintain the power flow, and enable to reduce the required withstand voltage ratings for power electronic elements. The limited requirements for current ratings of power electronic elements result also in significant size and footprint reduction.

Figure 2:
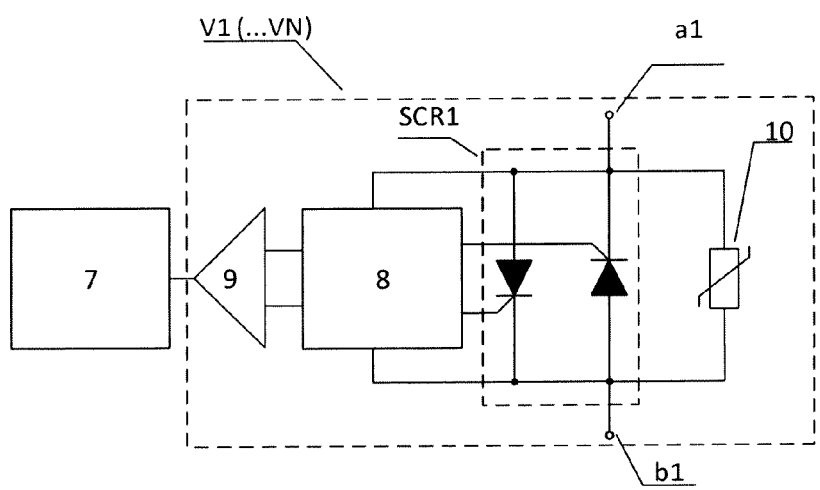
Figure 3:
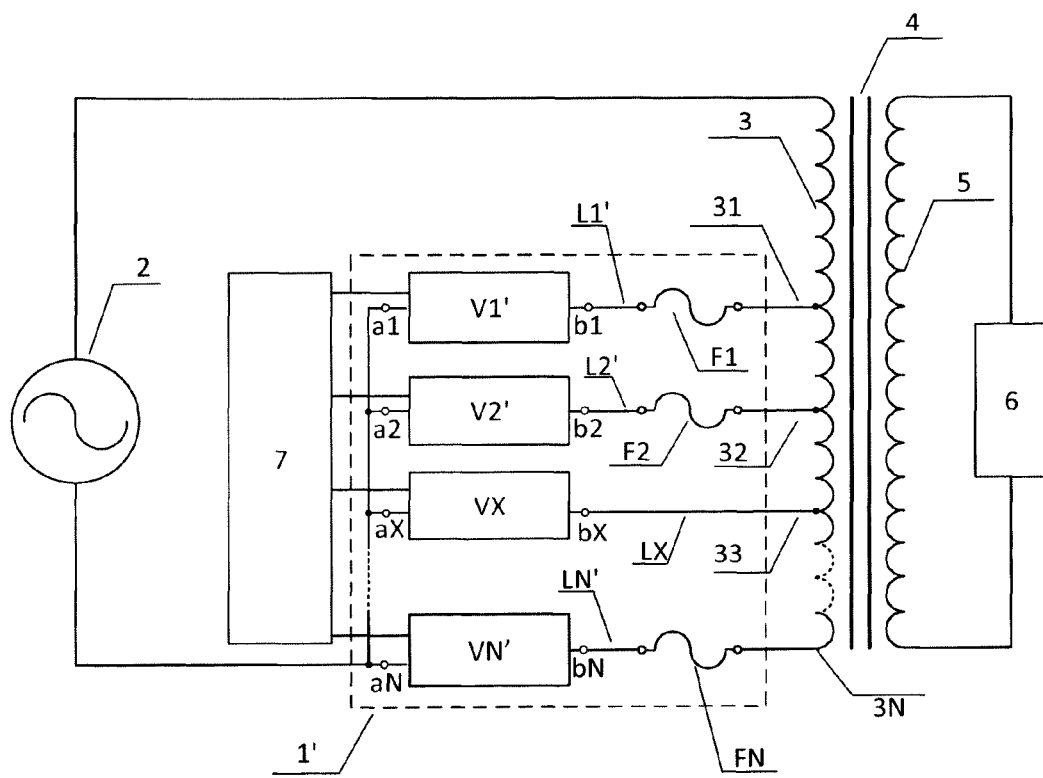
Figure 4:
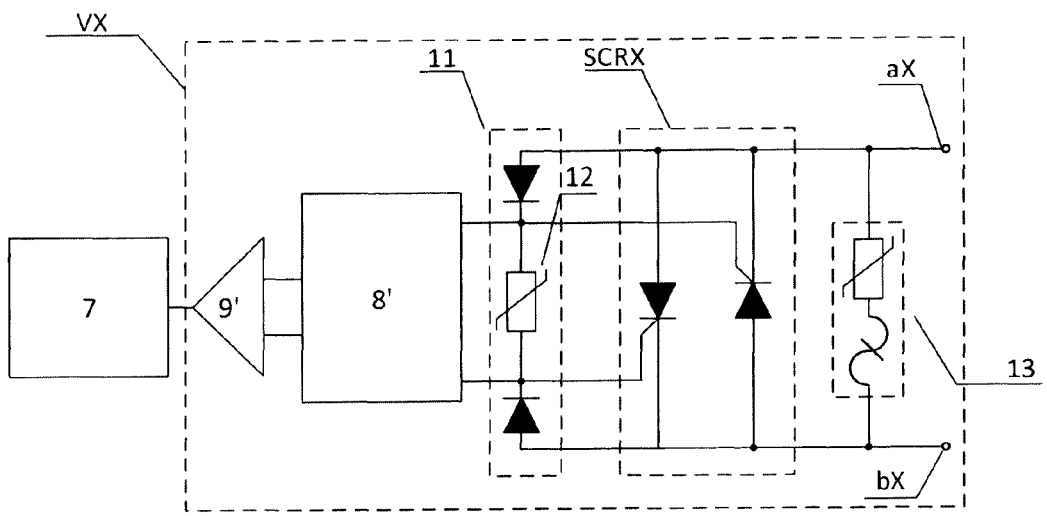

The invention is presented schematically on the drawing in exemplary embodiments for one phase, where FIG. 1 shows tap changer system known in the prior art, FIG. 2—a power electronic tap changer valve from FIG. 1 with main components rated for nominal current, FIG. 3—a tap changer system according to the invention with the additional valve, FIG. 4—a power electronic additional valve from FIG. 3 with main short circuit current rated valve with additional overvoltage triggering circuit.

The power electronic tap changer has a tap changer module 1 having multiple tap lines L1, L2, L3 . . . LN (N is a natural number) connected electrically through terminals a1 . . . aN, connected with a voltage source 2 from a supplied side directly or through primary winding 3 of transformer 4, and connected one by one through terminals b1 . . . bN with sections 31, 32, 33, . . . 3N to the primary winding 3 of the transformer 4. The secondary winding 5 of the transformer 4 is connected with a load 6. It is not a disturb to the invention that the winding of the transformer 4 have reverse names of secondary or primary windings. The each of the tap lines L1, L2, L3 . . . LN has an electronic valves V1 . . . VN connected with a controller 7 for selective triggering purpose. The valves V1 . . . VN has a pair of thyristors or transistors SCR1 connected with the controller 7 through a triggering circuit 8 and a control signal receiver 9 from one side. From the other side the thyristors or transistors SCR1 are connected with transient voltage suppressor device 10 for basic short-term overvoltage protection.

The presented electronic tap changer and its module are known from a standard solutions.

The tap changer module 1' according to the invention has multiple tap lines L1, L2', L3' . . . LN' (N' is a natural number) connected electrically through terminals a1' . . . aN', connected directly or through primary winding 3 of transformer 4 with a voltage source 2 from a supplied side, and connected one by one through terminals b1' . . . bN' with sections 31, 32, 33, . . . 3N to the primary winding 3 of the transformer 4 through overcurrent protection devices in the form of fuses F1 . . . FN, respectively. The transformer 4 can be one or three phase transformer. The module 1' has an additional tap line LX connected to the one section of the winding 3, through terminal bX which is also connected directly or through the primary winding 3 of transformer 4 with a voltage source 2, through terminal aX. This additional tap line LX is equipped with short-circuit current rated valve VX only, without any of the overcurrent protection device in the form of the fuse connected in series. The VX valve is directly connected to the primary winding 3 through terminal bX. The oversized nominal valve VX is designed with thyristors or transistors which are able to handle the short circuit current for required period of time, given in transformer 4 specification. Other valves V1 . . . VN are designed for withstanding the nominal current continuously.

The VX valve has a pair of thyristors or transistors SCRX connected from the one side with the controller 7 through an overvoltage triggering circuit 11, the triggering circuit 8' and through the control signal receiver 9', where triggering circuit 8' and overvoltage triggering circuit 11 are connected in parallel. The overvoltage triggering circuit 11 has a transient voltage suppressor MOV device 12 connected in parallel to the triggering circuit 8'. The MOV device 12 can also have a form of a set of diodes or transistors, what is not presented in the drawing. The MOV device 12 is connected with the primary winding section 33 of the transformer 4 through two diodes in reverse polarity, connected to the terminals aX and bX. From the other side the thyristor SCRX is connected in parallel with a thermally protected voltage suppressing device 13 in the form of a thermally protected MOV. The voltage suppressing device 13 can also have a form of a set of diodes or transistors, what is not presented in the drawing.

The operation of the tap changer according to the invention is presented in two scenarios.

The first scenario, takes place in case of short circuit or overcurrent conditions. If by the time of short circuit the tap changer module 1' conducts the current via one of standard valves V1 . . . VN, excluding VX, the situation leads to triggering of the corresponding overcurrent protection element—fuse F1 . . . FN. This creates open circuit conditions in tap changer module 1', which are for limited time handled by overvoltage protection means, in this case the voltage suppressing device 13 on valve VX. The voltage suppressing device 13 is thermally protected MOV, which means that it is automatically disconnected after significant temperature rise. After MOV device disconnection, the overvoltage triggering circuit 11 present on nominal oversized valve VX immediately detects the overvoltage conditions and triggers the valve SCRX, which result in reduction of the voltage in first place, but also in change of the short circuit current path to pass the nominal oversized valve VX only, as it is the only one rated for the mentioned conditions. If short circuit current or overcurrent occurs by the time tap changer 1' conducts current through the valve VX, no action is taken as oversized valve VX is rated for this condition.

The second scenario of operation takes place in case of long term overvoltage or open circuit conditions. The solution presented in invention behave in similar way to described above. Situation of long-lasting overvoltage or open circuit conditions result in overheating of standard transient overvoltage protection means i.e. MOV device 13, leading to the temperature protection triggering, which disables the MOV device 13. After MOV device deactivation the overvoltage triggering circuit 11 present in nominal oversized valve VX triggers the nominal valve immediately thus reduces the voltage across power electronic tap changer module 1' to safe level and maintains the power flow through the module 1'.

The invention claimed is:

1. A power electronic tap changer module for a transformer, connected to a section of a primary winding of the transformer through tap lines, where each of the tap lines is equipped with one or more first valves; each first valve has a pair of thyristors or transistors connected with a controller through a triggering circuit and a control signal receiver connected in parallel; the pair of thyristors or transistors is connected in antiparallel to each other and in parallel with a transient voltage suppressor device for overvoltage or open circuit protection in response to a short circuit or overcurrent condition, wherein the one or more first valves of the tap lines are each connected in series with a respective fuse; the power electronic tap changer module being further equipped with an additional tap line having a second valve for overvoltage or open circuit protection in response to triggering of the respective fuses in response to the short circuit or overcurrent condition, which second valve is equipped with an overvoltage triggering circuit; the second valve is equipped with a second pair of thyristors or transistors connected in antiparallel to each other and is connected in parallel with a voltage suppressing device that disconnects in response to overheating.

2. The power electronic tap changer module according to claim 1, wherein the overvoltage triggering circuit has a metal oxide varistor device or transient voltage suppressor diodes and a pair of diodes with reverse polarity.

3. The power electronic tap changer module according to claim 1, wherein the voltage suppressing device of the second valve is a thermally protected metal oxide varistor device or transient voltage suppressor diodes.

4. The power electronic tap changer module according to claim 1, wherein the second valve is connected directly to the primary winding.

5. The power electronic tap changer module according to claim 1, wherein the first valves and the second valve are connected directly to a voltage source.

6. The power electronic tap changer module according to claim 1, wherein the first valves and the second valve are connected through the primary windings to a voltage source.

7. The power electronic tap changer module according to claim 1, wherein the second valve is rated for short-circuit current whereas the first valves are rated for nominal current.

8. The power electronic tap changer module according to claim 1, wherein the transient voltage suppressor device of each of the first valves is thermally protected.

9. The power electronic tap changer module according to claim 2, wherein the transient voltage suppressor device of each of the first valves is a thermally protected metal oxide varistor device or transient voltage suppressor diodes.

10. The power electronic tap changer module according to claim 2, wherein the second valve is connected directly to the primary winding.

11. The power electronic tap changer module according to claim 3, wherein the second valve is connected directly to the primary winding.

12. The power electronic tap changer module according to claim 4, wherein the second valve is connected directly to the primary winding.

13. The power electronic tap changer module according to claim 9, wherein the second valve is connected directly to the primary winding.

14. The power electronic tap changer module according to claim 2, wherein the first valves and the second valve are connected directly to a voltage source.

15. The power electronic tap changer module according to claim 3, wherein the first valves and the second valve are connected directly to a voltage source.

16. The power electronic tap changer module according to claim 4, wherein the first valves and the second valve are connected directly to a voltage source.

17. The power electronic tap changer module according to claim 5, wherein the first valves and the second valve are connected directly to a voltage source.

18. The power electronic tap changer module according to claim 2, wherein the first valves and the second valve are connected through the primary windings to a voltage source.

19. The power electronic tap changer module according to claim 3, wherein the first valves and the second valve are connected through the primary windings to a voltage source.

20. The power electronic tap changer module according to claim 4, wherein the first valves and the second valve are connected through the primary windings to a voltage source.

* * * * *